United States Patent [19]

Bergman et al.

[11] 4,323,728

[45] Apr. 6, 1982

[54] CONVERSION CIRCUIT ARRANGEMENT AND METHOD FOR SWITCHING DIGITAL ENCODED SIGNALS

[75] Inventors: Ola Bergman, Munich; Rolf Hagen, Unterhaching; Juergen Harenberg, Munich; Herbert Steiner, Gelting, all of Fed. Rep. of Germany

[73] Assignee: Siemens Aktiengesellschaft, Berlin and Munich, Fed. Rep. of Germany

[21] Appl. No.: 129,397

[22] Filed: Mar. 10, 1980

[30] Foreign Application Priority Data

Mar. 30, 1979 [DE] Fed. Rep. of Germany ....... 2912649

[51] Int. Cl.³ .......................... H04N 1/32; G06F 3/14; H04Q 3/54
[52] U.S. Cl. ...................................... 178/3; 178/26 R
[58] Field of Search ................ 178/2 R, 3, 17.5, 26 R, 178/26 A, 30; 370/41, 91; 364/900; 179/18 ES

[56] References Cited

U.S. PATENT DOCUMENTS

| | | |
|---|---|---|
| 3,935,391 | 1/1976 | Weir et al. |
| 3,958,088 | 5/1976 | Vieri ........................................ 178/3 |
| 4,144,407 | 3/1979 | Zaffignani et al. ............. 179/18 ES |
| 4,156,796 | 5/1979 | O'Neal et al. ............................ 178/3 |
| 4,241,802 | 12/1980 | Bergman ................................. 178/3 |

FOREIGN PATENT DOCUMENTS

1193085  5/1965  Fed. Rep. of Germany.
2416730 10/1974  Fed. Rep. of Germany.

OTHER PUBLICATIONS

Technical Manual: *Siemens System Eds.*, Oct. 1977, Ref. No. F234/150.18.101, Siemens Abt., Munich, W. Germany.

*EDS-A New Electronic Data Switching System*, Nachrichtentechnische Zeitschrift (22), 1969, No. 8, pp. 444-463.

Nachrichtentechnische Zeitschrift (29), 1976, No. 3, pp. 196 and 219.

"The Public Switched Data Network of the Deutsche Bunderpost..." published in Evolutions in Computer Communications, 1978.

"A Commercial Test of Digital Networks and its Future Survey" published in International Switching Symposium, Japan, 1976.

*Primary Examiner*—Thomas A. Robinson
*Attorney, Agent, or Firm*—Spellman, Joel and Pelton

[57] ABSTRACT

There is disclosed a conversion circuit arrangement for switching digital data signals between data terminals operating with different data transmission procedures. The circuit arrangement adapted for use with an electronic data switching system is composed of at least two interface circuits having input/output converting networks. External terminals of these interface circuits are connected to respective input/output means of the switching system for each type of data terminal. Internal input/output terminals of the interface circuits are connected to respective terminals of a storage unit. There is provided a control unit for controlling data transmission between the interface circuits and the storage unit and vice versa such that messages are buffered in the storage unit. The stored message is converted according to the data transmission procedure of the receiving data terminal.

10 Claims, 1 Drawing Figure

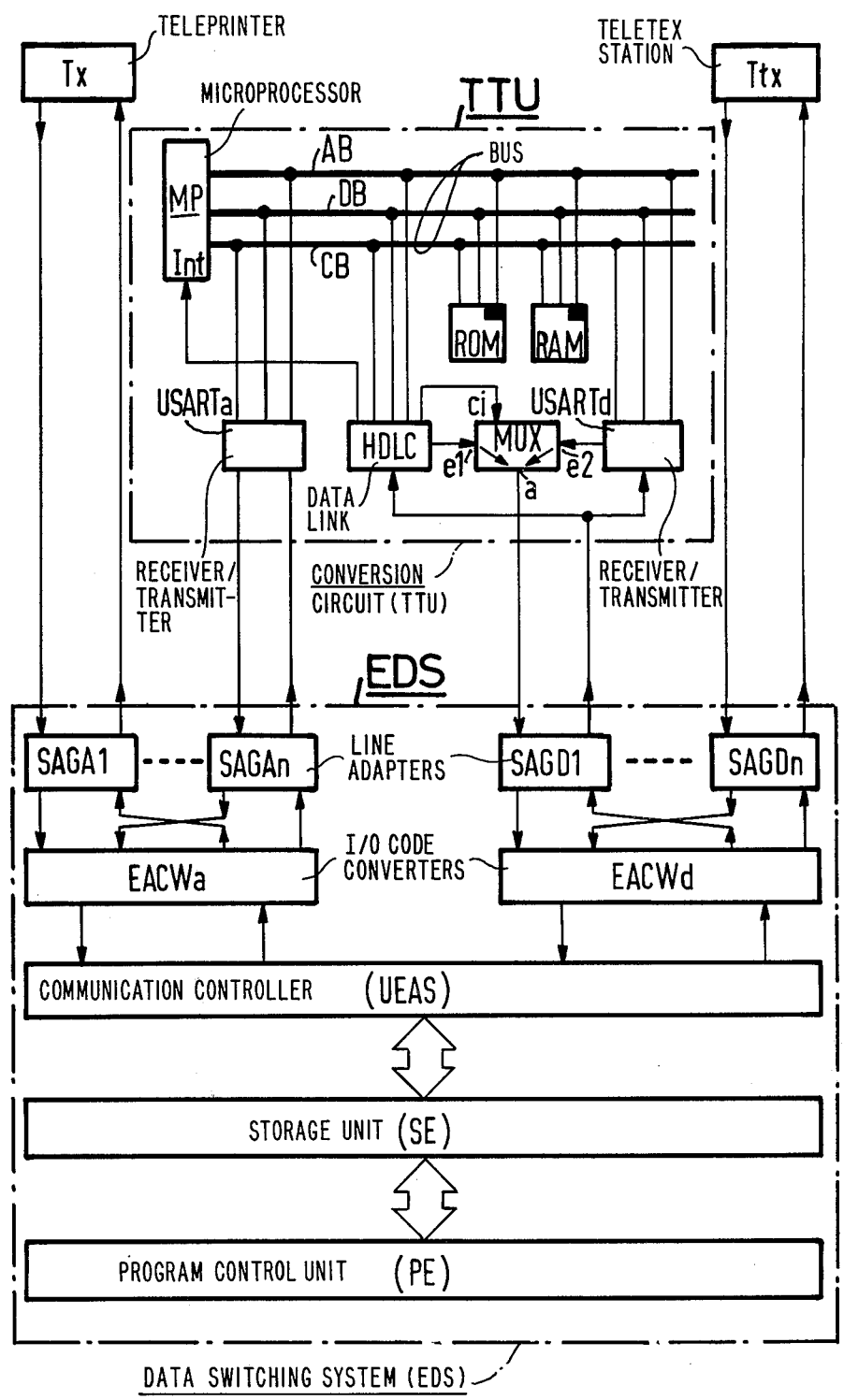

CONVERSION CIRCUIT ARRANGEMENT AND METHOD FOR SWITCHING DIGITAL ENCODED SIGNALS

BACKGROUND OF THE INVENTION

The present invention is directed to communication systems for digital information and particularly to an electronic digital switching system for data communication which is suitable for use with different types of remote digital terminals.

Particularly, the invention is directed to a conversion circuit arrangement for switching digital encoded signals between different types of data terminals operating with distinctive interfaces with respect to data transmission procedures and to a method for switching digital encoded signals between such data terminals of different types. The term "data transmission procedure" is hereinafter referred to including the signalling information and procedure, the control of data transmission and also to the data format and the data rate during transmission.

Data communication networks, such as the telex network, have become increasingly important during the recent years. Data processing techniques have penetrated all branches of industry, commerce and public administration and, as a result, different types of data terminals using different transmission procedures have been developed. Office teletypewriter machines are an example of a new kind of remote data terminal which will come more and more into use. This type of a data terminal combines facilities for typewriting, text processing and telecommunication and is, in general, composed of a keyboard, a display, a printing unit, storage units, and a transmission unit. The main concept is to have reasonably priced office equipment combining all of these different facilities and to have this equipment connectable to public communication networks so that the equipment operator can communicate with operators of similar equipment. Under this concept, even telex stations are connectable to such office teletypewriter stations, also often called teletex machines. The usage of terms with respect to this new type of data terminal is not yet consistent. For distinguishing the conventional teleprinter from this office equipment having the described characteristics hereinafter the term "teletex stations" is used. Accordingly, facilities for two different data transmission procedures (i.e. standards) have to be provided. A telex station operates in a start-stop mode and with a data rate of 50 bits/sec., whereas a teletex station connected to a telephone system has synchronous data transmission at a rate of 2,400 bits/sec.

Recently developed switching systems for digital telecommunications are suitable for use with different communication networks to handle telex traffic and other data traffic. A digital switching system of this type is disclosed in the technical manual *Siemens Systems EDS, System Description*, which is published and distributed by Siemens Corp., Iselin, N.J., and which is incorporated herein by reference. This known electronic digital switching system is capable of handling the above-mentioned different types of data traffic with one exchange, that is the hardware and software is designed to respond to different data transmission procedures for telex traffic and other data traffic simultaneously. However, the constraint of having a complex structure for different signalling, data format and data rate restricts the use of one exchange to switching operations within a respective one of the groups of data terminals. For this reason, basically the data switching system has to have data terminal interfaces so-called line adapters which are grouped in sets each serving a different type of data terminals. Two line adapter sets, each assigned to a different group of data terminals operating with different data transmission procedures, cannot be linked together to set up a physical communication link across the exchange. Nevertheless, an electronic digital switching system serving different types of data traffic is a sophisticated special purpose data processing system; with extensive software and even built-in hard wired logic required for real time conditions and system reliability.

Trends of current data traffic and design features meeting requirements of increasing communication needs and offering possibilities for integrating the up to now independent data networks have been discussed in an article in *Nachrichtentechnische Zeitschrift*, Vol. 22, 1969, pages 444 to 463 with the title "EDS-A New Electronic Data Switching System For Data Communication" which article is also incorporated herein by reference. The contents of this article point out very clearly the complexity of design of such an electronic digital switching system which is necessary to meet recent requirements. It is understood by those skilled in the art that such a special purpose data processing system for handling data transmission procedures reasonably cannot be designed to be as flexible as to offer all possibilities of direct communication between different data terminals. It is nearly impossible to be prepared for new data terminals which may become important at some future time after the exchange is already installed.

Coming back to the aforementioned example of direct data communication between a teleprinter and a teletex station, the present restriction in data exchange of switching data just from one type of data terminal to the same type of data terminal requires that teletex stations be designed such that they can be switched between two modes of communication and operation. In particular, a teletex station must be designed to operate at a data rate of 50 bits/sec. using a start-stop method or at a rate of 2,400 bits/sec. for example, in a synchronous mode of operation. In the individual teletex station, however, this dual transmission capability means the provision of additional circuitry with its additional cost.

It is therefore, one object of the present invention to overcome restrictions of data communications in known data communication systems.

Another object of the present invention is to provide apparatus, adapted for use with an electronic data switching system, which avoids the need for expensive switching equipment in remote data terminals while permitting such data terminals to communicate with data terminals operating with different data transmission procedures.

Still another object of the invention is to improve known data switching systems to achieve more flexibility in data communications between data terminals of different types without the cost of special circuitry.

SUMMARY OF THE INVENTION

In the present invention there is disclosed a conversion circuit arrangement for switching digital encoded signals between different types of data terminals. The circuit arrangement is adapted for use with an electronic data switching system, which is capable of controlling data exchange just between data terminals of the same type across a respective separate set of line adapters. To allow for data communication between data terminals of different types the conversion circuit arrangement is composed of at least two interface circuits both having an external input and output, a first internal input and output and a first control terminal. The interface circuits comprise input/output converting networks. Each of the external inputs is adapted for connection with a respective line adapter of a different set of line adapters. The circuit arrangement also has a storage unit with second internal inputs and outputs. The storage unit is arranged such that the first and the second internal inputs are connected in parallel to the second internal output and input, respectively.

There are provided control means for buffering of messages in said storage unit such that a message received by one interface circuit is buffered and read out across the other interface circuit with the data transmission procedure adjusted to the receiving type of data terminal. The control means have a third control terminal connected to the first and second control terminals to perform this operation.

This conversion circuit arrangement is adapted to be coupled to an electronic data switching system like a data terminal. Basically, it simulates first a called and then a calling data terminal from the viewpoint of the data switching system. The data switching system cannot set up a direct communication line between data terminals with different data transmission procedures. To overcome this restriction the message is handed out to this pseudo data terminal. There, the message is converted according to requirements of the data transmission procedure of the called data terminal. Then the conversion circuit arrangement sends a call request based upon a signalling procedure of a data terminal of the called type. Upon this request the data switching system switches the converted message to the originally called data terminal.

This solution is most effective in terms of costs. A data terminal i.e. a teletex station for example, has not to be provided for additional switching equipment and can be of simpler design. Also the central switching system does not have to have sophisticated additional design features or preparations for future expanding. Every time when adjustments for different types of data terminals will be necessary this can be achieved by redesigning of a small circuit arrangement without impact on the whole system.

The invention also is directed to a method for switching digital encoded signals between data terminals operating with different data transmission procedures controlled by an electronic digital switching system serving different types of data terminals. The switching system usually has a communication unit formed of different sets of line adapters each associated with a respective type of data terminals. When a message is to be sent from a data terminal to a line adapter of one set of line adapters assigned to the sending type of data terminals, the call request information is analyzed by the electronic digital switching system. Accordingly, a line connection is set up from the busy line adapter across a second line adapter of the same set of line adapters to the conversion circuit arrangement. This circuit arrangement simulates a receiving data terminal and is connected to all line adapter sets of the data switching system by respective line adapters. The message is transmitted into the conversion circuit arrangement and stored temporarily. A line adapter of the line adapter set assigned to the receiving type of data terminals is selected. Under control of the circuit arrangement the buffered message converted according to the data transmission procedure of the receiving data terminal, is sent out across the selected outgoing line adapter and switched to the receiving data terminal under control of the electronic data switching system. This is achieved by using the normal control facilities of the data switching system as if the message were sent out by a data terminal of the receiving type.

This method adds new design features and switching capabilities to known digital switching systems and is most efficient in new possibilities for updating existing and already installed exchanges.

A better understanding of the invention may be had by reference to the following description of a preferred embodiment in conjunction with the accompanying drawing.

BRIEF DESCRIPTION OF THE DRAWING

The single FIGURE shows a schematic diagram of an electronic data switching system and coupled to this system a conversion circuit arrangement simulating data terminals of different types.

DESCRIPTION OF THE PREFERRED EMBODIMENT

In the drawing, a known electronic data switching system EDS is shown schematically. A first data terminal Tx, representing a first type of data terminal and hereinafter referred to as telex station, interfaces with a first set of line adapters SAGA1 to SAGAn. A second set of line adapters SAGD1 to SAGDn is assigned to a second group of data terminals including a second data terminal Ttx, hereinafter referred to as teletex station. Each set of line adapters SAGA1 to SAGAn and SAGD1 to SAGDn is connected to a respective network of input/output code converters EACWa and EACWd. These networks, in turn, are connected to a communication controller unit UEAS communicating with a storage unit SE and a program control unit PE. The design and the facilities of such an electronic data switching system EDS, here shown in a schematic block diagram, are well known to those skilled in the art and are additionally described in the references mentioned in the Background of the Invention. Further detailed description therefore does not seem to be necessary, as the data switching system in itself forms no part of the invention.

Essential for the better understanding of the invention is that each set of line adapters of the electronic data switching system serves a different type of data terminal. The first set of line adapters SAGA1 to SAGAn is assigned as shown in the Figure to teleprinters or data terminals of a type which operate in a start-stop mode. The data transmission rate of a teleprinter usually is 50 baud while a message is encoded according to the International Telegraph Alphabet No. 2. According to this alphabet a character consists of five elements with a preceding start pulse and succeeding stop pulse. The second set of adapter lines SAGD1 to SAGDn is assigned to a different type of data terminal, i.e. teletex stations Ttx. These data terminals operate with a different data transmission procedure. Teletex stations are understood to operate with a synchronous data transmission mode and a data rate of 2,400 bits/second for example. In the synchronous data transmission mode no start/stop pulses are used. The characters are encoded in the form of bit groups or envelopes, whereby normally 8 bits form a data word.

A conversion circuit arrangement TTU is connected to the data switching system EDS just like another remote data terminal; however, there is one specific difference: it is connected to both sets of line adapters, thereby simulating, with respect to the data switching system EDS both a data terminal of the teleprinter type and a data terminal belonging to the group of teletex stations.

To achieve this basic design feature the conversion circuit arrangement TTU is connected to one line adapter SAGAn of the first set of line adapters by external inputs and outputs of a first interface circuit USARTa. Furthermore, the conversion circuit arrangement TTU is connected to another line adapter SAGD1 of the second set of line adapters also by external inputs and outputs of a second interface circuit. This second interface circuit is composed of a signalization-conversion circuit USARTd and a data transmission circuit HDLC. Both circuits of the second interface circuit are connected by their external inputs in parallel to the output of the line adapter SAGD1. This line adapter SAGD1, furthermore, is connected by its input to the output a of a multiplexor network MUX which is connected by signal inputs e1, e2 to first outputs of the data transmission circuit HDLC and the signalization conversion circuit URSTd, respectively. The muliplexor network MUX is connected to a control output of the data transmission circuit HDLC via a control line connected to a control input ci of the multiplexor network MUX. A control signal fed to the control input ci of the multiplexor network MUX controls its operating condition. Depending upon the status of this control signal, the multiplexor network MUX connects its output a either with its first signal input e1 or with its second signal input e2. The control of the multiplexor network MUX may be designed such that it switches automatically to one of these operating conditions if the control signal is absent.

The interface circuits described above are composed of well known, commercially available components. The first interface circuit USARTa and the signalization circuit USARTd, forming a part of the second interface circuit are Universal Synchronous Asynchronous Receiver Transmitters, which are sold by Intel Corp. as its component #8251. The data transmission circuit is known as High Level Data Link Control, also sold by Intel Corp. as its component #8273. The multiplexor circuit can be formed of well known components SN 74151. Detailed schematics of the individual components, therefore, have not been shown in the FIGURE and related detailed description of the design is not necessary for an understanding of the invention.

However, let it be noted here that the described first outputs of the data transmission circuit HDLC and of the signalization-conversion circuit USARTd connected to the inputs e1 and e2 of the multiplexor network MUX, respectively do not deliver signals that have been applied to each one of the circuits by their respective first external inputs. The data transmission circuit HDLC and the signalization-conversion circuit USARTd have second internal inputs, the operation of which inputs will be described in detail, yet. For the moment it may be sufficient to note that just input signals supplied to the internal inputs of the data transmission circuit HDLC or the signalization-conversion circuit USARTd are transmitted to the multiplexor network MUX after processing in the respective circuit HDLC and USARTd. It has been described that the operating condition of the multiplexor network MUX is controlled by a control signal sent out by the data transmission HDLC. This control signal is dependent on the main control scheme of the conversion circuit arrangement TTU which still has to be described in full detail.

The above-considered first interface circuit USARTa, the data transmission circuit HDLC and the signalization-conversion circuit USARTd are connected by a number of internal terminals with a control network of the conversion circuit arrangement TTU. In this embodiment of the invention there is provided a microprocessor system for controlling the conversion circuit arrangement TTU. The microprocessor system is composed of a microprocessor MP, a Read Only Memory, hereinafter referred to as control memory ROM, and a main memory, the Random Access Memory RAM. For transmitting data within this control network, a bus structure having a number of bus lines is provided. First bus lines constitute an address bus AB, second bus lines form a data bus DB and third bus lines represent a control bus CB. According to known principles of microprocessor systems with multibus structure all circuits, the microprocessor MP, the control memory ROM, the storage unit RAM, the first interface circuit USARTa, the data transmission circuit HDLC and the signalization-conversion circuit USARTd are connected to the bus structure in parallel.

All circuits forming the microprocessor system, are well known in the art, and commercially available components can be used. The control memory ROM may be composed of Intel memory components #2732 and the random access memory RAM can consist of Intel components #2185. The microprocessor MP in itself may be an Intel processor #8085.

Whereas normally all data, concerning addresses, data information and control signals are transmitted across this bus structure still another circuit connection is provided. The data transmission circuit HDLC is connected by a separate output to an interrupt input Int of the microprocessor MP. This connection serves as separate control line by which line the data transmission circuit HDLC is enabled to interrupt the microprocessor MP. Thereupon, the microprocessor MP will take over controlling data transmission routines within the conversion circuit arrangement TTU as will be described later in more detail.

In the following there will be described the mode of operation of this circuit arrangement. The main functions of the electronic data digital switching system EDS are well known and will not be described in detail. However, for better understanding of the invention, the basics of the transmission procedure during a connection of a teleprinter Tx and a teletex station Ttx will be discussed.

Let it be assumed that the teleprinter Tx is sending a message with 50 baud. A message, hereinafter is understood as a complete telex. The digital signals of this message including signalling information, address information and text information are received by the electronic data switching system EDS at the respective line adapter SAGA1 connected to the calling teleprinter Tx.

The electronic data switching system EDS analyzes the receiving type of data terminal by the address of the called station. If the called station operates with a different data transmission procedure, the message cannot be switched directly to the receiving station. Thereupon, the electronic data switching system EDS switches the message to the conversion circuit arrangement TTU, in this case simulating a teleprinter. This data transmission is controlled by the normal operation of the electronic data switching system EDS, just as if a message between two teleprinters had been transmitted.

Accordingly, the message is transmitted from the respective line adapter SAGAn assigned to the conversion circuit arrangement TTU to its first interface circuit USARTa. This first interface circuit converts the digital signals received in series, into a parallel form, for example into 8 bit data words assuming an 8 bit data structure of the microprocessor system. The converted data signals are then transmitted via the bus structure to the random access memory RAM. In so doing, all digital signals belonging to the message are stored in the random access memory RAM prior to any further switching procedure.

When the entire message has been stored in the random access memory RAM the message will be read out to be delivered by the data bus DB to the data transmission circuit HDLC. This circuit now processes a parallel-to-series conversion of the received data signals.

Furthermore, the data transmission circuit HDLC is provided for reformatting of the received data signals to establish the data format requested for a data transmission procedure of teletex stations. The data transmission circuit HDLC delivers the digital signals in the format and with a data transmission rate which is determined for teletex stations. These outgoing data signals, as mentioned above, are delivered via the multiplexor network MUX and the line adapter SAGDl of the second set of line adapters to the electronic data switching system EDS. Upon receiving the message again, at one of its line adapters assigned to teletex stations, the electronic data switching system is enabled by one of its general functions to switch this message to the called teletex station Ttx.

For messages running in the opposite direction from an teletex station Ttx to a teleprinter Tx, the following procedure takes place: The data signals forming such a message are received by the respective line adapter SAGDn and analyzed by the electronic data switching system EDS. Again, the electronic data switching system EDS cannot switch this message directly to the called teleprinter Tx, because of the different data transmission procedures involved. In the electronic data switching system EDS the line adapter SAGDl assigned to the conversion circuit arrangement TTU is operated to send the message to the conversion circuit arrangement TTU, now simulating a teletex station from this side.

The incoming digital signals are received by the data transmission circuit HDLC which now performs a series-to-parallel conversion of the data signals to deliver the converted signals via the data bus DB to the random access memory RAM. In so doing, the complete message is stored in the random access memory RAM. Thereafter, these stored data signals are read out and transmitted via the data bus DB to the first interface circuit USARTa. This transmission procedure now takes place at a speed which corresponds to the data transmission rate of a teleprinter. The first interface circuit USARTa performs just a parallel-to-series conversion of the incoming data signal and is not designed for reformatting the incoming digital signals. Such reformatting is carried out by the data transmission circuit HDLC. The first interface circuit USARTa delivers the data signals of the message in a format and at a data rate according to the data transmission procedure of the called teleprinter Tx to the line adapter SAGAn. From there, the message can be switched by a normal switching function of the electronic data switching system EDS to the line adapter SAGAl which is assigned to the called teleprinter Tx.

The specific function of the signalization-conversion circuit USARTd has not been considered, yet. This circuit takes part of the control during the so-called signalization phase, i.e. during the time span of delivering signalling information from the teletex station Ttx to the teleprinter Tx or vice versa. This circuit enables the electronic data switching system EDS to service data terminals with different signalling procedures.

If different signalling procedures are used data information and signalling information of a message have to be separately processed. Receiving such information in the second interface circuit the data transmission circuit HDLC or the signalization-conversion circuit USARTd have to be switched through to the respective output of the connected line adapter SAGDl. The selectively operable modes of these two circuits of the second interface circuit are controlled by selection control signals delivered by the microprocessor MP at certain times during the respective transmission of digital signals to or from the random access memory RAM. Thereby, the signalization-conversion circuit USARTd is selectively operable during the signalization phase whereas the data transmission circuit HDLC is operable during the following text transmission phase. The control signals selecting the signalization-conversion circuit USARTd occur during each signalization phase, i.e. during the time span of the delivery of signalling information from and to the random access memory RAM, respectively.

The interface circuits may be designed to recognize the occurrence of signalling information and thereupon deliver corresponding interrupt signals to the microprocessor MP.

For detailed understanding there will be described below a possible transmission procedure of digital signals between an teletex station Ttx and a teleprinter Tx. The signalling information delivered by the teletex station Ttx is sent via the respective line adapters SAGDn and SAGDl of the electronic data switching system EDS to the second interface circuit of the conversion circuit arrangement TTU. During the signalization phase the signalization-conversion circuit USARTd is selectively operable. The control of the signalization-conversion circuit USARTd is such that the received signalling information is replaced by a signalling information suitable for selecting the called teleprinter Tx and for keeping it operable during the text transmission phase. To perform this function the signalization-conversion circuit USARTd is controlled by the microprocessor MP. The microprocessor in itself can be caused to generate respective control signals upon request by interrupt signals as described above.

The converted signalling information is then delivered to the random access memory RAM and stored. The information is read out and sent via the first interface circuit USARTa to the electronic data switching system EDS and switched to the called telex station Tx.

During this step the called station is checked to determine if it is available.

In doing so the calling teletex station Ttx requests the called teleprinter Tx to generate a confirmation signal if it is actually reachable and available. This confirmation signal is channeled through the first interface circuit USARTa and delivered via the multiplexor circuit MUX to the calling teletex station Ttx. Having received this signal, the teletex station Ttx starts to send data signals representing text information. The respective data signals pass through the data switching system EDS to the data transmission circuit HDLC of the conversion circuit arrangement TTU and are buffered in the random access memory RAM. After having stored a complete message in the random access memory RAM, the message is delivered from the conversion circuit arrangement TTU to the called teleprinter Tx via the electronic data switching system EDS. When the entire message has been sent to the called teleprinter Tx, the teleprinter may send back an acknowledgement signal indicating that the message has been completely received. Upon recording of this acknowledgement signal, the conversion circuit arrangement TTU sends a confirmation signal to the calling teletex station Ttx indicating to the calling station that the message previously sent out has been received by the called teleprinter Tx. The clearance of the line connection will then be carried out according to normal functions of the electronic data switching system EDS.

A similar transmission procedure takes place for messages transmitted from a teleprinter to a teletex station in the opposite direction. In this case, the signalization-conversion circuit USARTd transponds the signalling information of the calling teleprinter into the signalling information suitable for the called teletex station. Respective procedures are again controlled by the microprocessor MP.

In connection with these transmission procedures, it is preferred to store the station identification numbers of the calling station and the called station in the random access memory RAM of the conversion circuit arrangement TTU. In this case, physical connections from the calling station to the called station via the electronic data switching system EDS and the conversion circuit arrangement TTU do not have to be maintained along the whole line. In a first step, there is established a connection from the calling station to the conversion circuit arrangement TTU, merely to deliver the signalling information including the identification number of the called station and the respective number of the calling station. After having transmitted this information, the connection can be released. Upon request of the conversion circuit arrangement TTU there will then be established a corresponding physical connection for checking whether the called station is available. This simply means that the called station is connected to the electronic data switching system EDS and is ready to operate. In this case, the conversion circuit arrangement TTU will subsequently build up a new connection to the calling station requesting to send the message. This connection is released after having transmitted the complete message. Upon the request of the conversion circuit arrangement TTU, a second connection to the called station will be established in order to supply the message to the called station. After having transmitted the message there will follow a normal line clearance phase between the conversion circuit arrangement and the called station, during which operation the physical connection is released. The conversion circuit arrangement TTU then causes the electronic data switching system to build up a last physical connection to the calling station in order to transmit a message receipt confirmation. Thereafter, also this connection is released.

While the conversion circuit arrangement herein described constitutes a preferred embodiment of the invention, it is to be understood that the invention is not limited to this precise design for carrying out the described control operations. For example, the invention is not restricted to switching procedures between teleprinters and teletex stations. These two types of data terminals have been chosen for describing an evident example, however there can also be data transmission between other types of data terminals. Furthermore, the described signalling and data transmission procedures may be replaced by other known procedures to switch data from one data terminal to another. Known electronic data switching systems are designed such that they can perform a variety of these procedures and those skilled in the art know the actual designs for controlling these procedures. The conversion circuit arrangement mainly composed of a programmable control unit and specialized interface circuits has merely to simulate different types of data terminals. Such data transmission procedures are well defined and those skilled in the art will be capable of designing control operations for digital switching according to these procedures.

Therefore, the actual design of the conversion circuit arrangement can be performed accordingly by mere adjustments. It may be also understood that the conversion circuit arrangement may comprise a variety of interface circuits if more than two types of data terminals are to communicate with each other. The necessary programming routines are so well known from the principles of electronic digital data switching systems that those skilled in the art just have to adjust these known routines to the actual application.

We claim:

1. A conversion circuit arrangement for establishing bidirectional communication links between different types of data terminals operating with distinctive interfaces with respect to data transmission procedures including signalling, data format and data rate, said circuit arrangement adapted for use with an electronic data switching system capable of controlling data exchange only between data terminals of the same type and including a plurality of sets of line adapters, each set forming connection units associated with just one type of data terminal, said conversion circuit arrangement comprising:
 (a) at least two interface circuits each having an external input and output, a first internal input and output and a first control terminal, each including input/output converting networks connected to said internal and external inputs and outputs, and each adapted to be connected to a respective line adapter of a different set of line adapters;
 (b) a storage unit adapted for intermediately storing complete messages of transmitting data terminals and having a second internal input and output and a second control terminal, said first and second internal inputs and outputs being connected in parallel to said second internal output and input, respectively; and (c) a control means for controlling the buffering of messages in said storage unit such that a message received by one interface circuit in accordance with the data transmission procedure associated with the transmitting data terminal is intermediately buffered and is read out across the other interface circuit using the different data transmission procedure of the receiving data terminal, said control means having a third control terminal being connected to said first and second control terminals, wherein said conversion circuit arrangement simulates, with respect to said electronic data switching system, a different type of data terminal by means of each interface circuit and allows of inter-connecting different sets of line adapters.

2. The conversion circuit arrangement as recited in claim 1, wherein the control unit comprises a processor unit, a separate control memory for storing control routines of respective data transmission procedures and a bus structure having address lines, data lines and control lines to which lines respective inputs and outputs of the processor unit, the control memory, the storage unit and respective ones of said first and second internal inputs and outputs and said control terminals of the interface circuits are connected.

3. The conversion circuit arrangement as recited in claim 2, wherein said processor unit, upon request of a busy interface circuit, allocates access to the bus structure 50 as to connect the storage unit first to the requesting interface circuit for buffering the message and then to the respective interface circuit being assigned to the called type of data terminals.

4. The conversion circuit arrangement as recited in claim 3, wherein said processor unit further comprises at least one interrupt input, at least one interface circuit includes a separate control output, and said interrupt input and said control output are connected by a separate control line.

5. The conversion circuit arrangement as recited in claim 4, wherein at least a first one of said interface circuits comprises an input/output conversion network composed of series-to-parallel converters and parallel-to-series converters for converting the data format of incoming and outgoing data signals, respectively.

6. The conversion circuit arrangement as recited in claim 5, wherein a second one of said interface circuits further comprises a second converting network composed of series-to-parallel converters and parallel-to-series converters for converting signalling information and a transmitting network arranged in parallel with said converting network for changing the data format of incoming data information and transmitting the data signals into said storage unit, and both networks having inputs and outputs, forming said internal and external inputs and outputs, respectively of said second interface circuit.

7. The conversion circuit arrangement as recited in claim 6, wherein said second interface circuit further comprises a multiplexor network including two multiplexor inputs and one multiplexer output, each of said multiplexer inputs connected to a respective one of said outputs of the second converting network and the transmitting network, respectively, and said multiplexer output forming said external output of said second interface circuit and being adapted for connection with said input means for transmitting digital signals to the electronic data switching system, wherein the multiplexer network is controlled to selectively couple said second converting network and said transmitting network to said output means.

8. A method for establishing bidirectional communication links between data terminals operating with different data transmission procedures including signalling, data format and data rate controlled by an electronic digital switching system capable of controlling data exchange only between data terminals of the same type and including a plurality of sets of line adapters, each set forming connection units associated with just one type of data terminal, said method comprising the steps of:
 (a) sending a call request and signalling information from a calling data terminal to a line adapter of one set of line adapters assigned to the sending type of data terminal;
 (b) analyzing the information by the electronic digital switching system and setting up a line connection from the busy line adapter across a second line adapter of the same set of line adapters to a conversion circuit arrangement simulating a receiving data terminal adapted to communicate by means of the data transmission procedure of the calling data terminal and being connected to all line adapter sets by respective line adapters;
 (c) transmitting the message into the conversion circuit arrangement and storing the complete message in said conversion unit temporarily;
 (d) selecting the outgoing line adapter of the line adapter set assigned to the called type of data terminal to which the message is to be transmitted;
 (e) sending the buffered message in converted form in accordance with the data transmission procedure of the receiving type of data terminal to the selected outgoing line adapter; and
 (f) switching the message under control of the electronic data switching system to the called data terminal; thereby using the normal control facilities of said data switching system as if the message were sent out by a data terminal of the receiving type.

9. The method for switching digital encoded signals as recited in claim 8, wherein step (c) and step (d) are carried out under the control of the conversion circuit arrangement which comprises an independent processing system having interface circuits each being assigned to a respective line adapter set to perform data input/output transfer according to the different data transmission procedures.

10. The method for switching digital encoded signals as recited in claim 9, wherein the control operation of the conversion circuit arrangement is started upon request of an interface circuit receiving data signals from its respective line adapter.

* * * * *